(12) United States Patent
Hart et al.

(10) Patent No.: US 7,835,749 B1
(45) Date of Patent: Nov. 16, 2010

(54) LOCATION INSPECTOR IN WIRELESS NETWORKS

(75) Inventors: Brian Donald Hart, Sunnyvale, CA (US); Milind Paranjpe, Mountain View, CA (US); Emilio Maldonado, San Jose, CA (US); Allan Thomson, Pleasanton, CA (US); Bhautik Doshi, Fremont, CA (US); Anita Pandey, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 11/542,720

(22) Filed: Oct. 3, 2006

(51) Int. Cl.
 H04W 40/00 (2009.01)
 H04W 24/00 (2009.01)
 G01S 3/02 (2006.01)

(52) U.S. Cl. .................. 455/446; 455/457; 342/450

(58) Field of Classification Search ... 455/456.1–456.6, 455/446, 423, 67.11, 457; 342/450
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston et al. | |
| 5,327,144 A | 7/1994 | Stilp et al. | |
| 5,394,158 A | 2/1995 | Chia | |
| 5,396,582 A | 3/1995 | Kahkoska | |
| 5,564,079 A | 10/1996 | Olsson | |
| 5,570,412 A | 10/1996 | LeBlanc | 455/456.2 |
| 5,666,662 A | 9/1997 | Shibuya | |
| 5,717,406 A | 2/1998 | Sanderford et al. | 342/457 |
| 5,732,354 A | 3/1998 | MacDonald | |
| 5,878,328 A * | 3/1999 | Chawla et al. | 455/67.11 |
| 6,112,095 A | 8/2000 | Wax et al. | |
| 6,115,605 A | 9/2000 | Siccardo et al. | |
| 6,134,338 A | 10/2000 | Solberg et al. | |
| 6,134,448 A | 10/2000 | Shoji et al. | |
| 6,140,964 A | 10/2000 | Sugiura et al. | |
| 6,167,274 A | 12/2000 | Smith | |
| 6,198,935 B1 | 3/2001 | Saha et al. | |
| 6,212,391 B1 | 4/2001 | Saleh et al. | |
| 6,226,400 B1 | 5/2001 | Doll | |
| 6,236,365 B1 | 5/2001 | LeBlanc et al. | |
| 6,243,811 B1 | 6/2001 | Patel | |
| 6,249,252 B1 | 6/2001 | Dupray | |
| 6,269,246 B1 | 7/2001 | Rao et al. | |
| 6,272,541 B1 | 8/2001 | Cromer et al. | |
| 6,275,190 B1 | 8/2001 | Sugiura et al. | |
| 6,282,427 B1 | 8/2001 | Larsson et al. | |
| 6,304,218 B1 | 10/2001 | Sugiura et al. | |

(Continued)

OTHER PUBLICATIONS

Cisco Systems Inc. "Cisco Wireless Control System Configuration Guide", Mar. 2006, Software release 3.2. All pages.*

*Primary Examiner*—Rafael Pérez-Gutiérrez
*Assistant Examiner*—Allahyar Kasraian
(74) *Attorney, Agent, or Firm*—Baker Botts L.L.P.

(57) ABSTRACT

In one embodiment, a method includes receiving calibration data, computing one or more attributes of a pathloss model based on the calibration data, computing estimated locations using the received signal strength values of the calibration data points, associating location errors with the one or more calibration data points, and computing a location quality within a region based on the associated location errors.

22 Claims, 7 Drawing Sheets

U.S. PATENT DOCUMENTS

| | | | |
|---|---|---|---|
| 6,317,599 B1 | 11/2001 | Rappaport et al. | |
| 6,317,604 B1 | 11/2001 | Kovach, Jr. et al. | |
| 6,366,242 B1* | 4/2002 | Boyd et al. | 342/450 |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,526,283 B1 | 2/2003 | Jang | |
| 6,556,942 B1 | 4/2003 | Smith | |
| 6,581,000 B2 | 6/2003 | Hills et al. | |
| 6,664,925 B1 | 12/2003 | Moore et al. | |
| 6,674,403 B2 | 1/2004 | Gray et al. | 342/463 |
| 6,704,352 B1 | 3/2004 | Johnson | |
| 6,728,782 B1 | 4/2004 | D'Souza et al. | |
| 6,754,488 B1 | 6/2004 | Won et al. | |
| 6,766,453 B1 | 7/2004 | Nessett et al. | |
| 6,799,047 B1 | 9/2004 | Bahl et al. | 455/456.1 |
| 6,804,394 B1 | 10/2004 | Hsu | |
| 6,850,946 B1 | 2/2005 | Rappaport et al. | |
| 6,990,428 B1 | 1/2006 | Kaiser et al. | 702/150 |
| 7,567,822 B2* | 7/2009 | Hart et al. | 455/562.1 |
| 7,602,338 B2* | 10/2009 | Smith et al. | 342/451 |
| 7,616,555 B2* | 11/2009 | Hart | 370/203 |
| 2002/0045424 A1 | 4/2002 | Lee | 455/41 |
| 2002/0058503 A1* | 5/2002 | Gutowski | 455/423 |
| 2002/0102988 A1 | 8/2002 | Myllymaki | |
| 2002/0115445 A1 | 8/2002 | Myllymaki | |
| 2002/0118118 A1 | 8/2002 | Myllymaki et al. | |
| 2002/0154134 A1 | 10/2002 | Matsui | |
| 2002/0168958 A1 | 11/2002 | Ford et al. | |
| 2002/0174335 A1 | 11/2002 | Zhang et al. | |
| 2002/0176366 A1 | 11/2002 | Ayyagari et al. | |
| 2003/0117985 A1 | 6/2003 | Fujii et al. | |
| 2003/0130987 A1 | 7/2003 | Edlund et al. | |
| 2003/0135486 A1 | 7/2003 | Edlund et al. | |
| 2003/0135762 A1 | 7/2003 | Macaulay | |
| 2004/0066757 A1 | 4/2004 | Molteni et al. | 370/329 |
| 2004/0072577 A1 | 4/2004 | Myllymaki et al. | |
| 2004/0111397 A1 | 6/2004 | Chen et al. | |
| 2004/0116111 A1* | 6/2004 | Saunders | 455/423 |
| 2004/0151377 A1 | 8/2004 | Boose et al. | |
| 2004/0166878 A1 | 8/2004 | Erskine et al. | 455/456.1 |
| 2004/0176108 A1 | 9/2004 | Misikangas | |
| 2004/0186847 A1 | 9/2004 | Rappaport et al. | |
| 2004/0198373 A1 | 10/2004 | Ford et al. | |
| 2004/0198392 A1 | 10/2004 | Harvey et al. | 455/456.1 |
| 2004/0203910 A1 | 10/2004 | Hind et al. | 455/456.1 |
| 2004/0236547 A1 | 11/2004 | Rappaport et al. | |
| 2004/0259554 A1 | 12/2004 | Rappaport et al. | |
| 2004/0259555 A1* | 12/2004 | Rappaport et al. | 455/446 |
| 2005/0128139 A1 | 6/2005 | Misikangas et al. | |
| 2005/0131635 A1 | 6/2005 | Myllymaki et al. | |
| 2005/0136845 A1* | 6/2005 | Masuoka et al. | 455/67.14 |
| 2005/0136944 A1 | 6/2005 | Misikangas et al. | |
| 2005/0185615 A1 | 8/2005 | Zegelin | 370/331 |
| 2005/0282540 A1* | 12/2005 | Motamedi et al. | 455/423 |
| 2005/0285792 A1* | 12/2005 | Sugar et al. | 342/465 |
| 2008/0166973 A1* | 7/2008 | Hart et al. | 455/67.11 |

* cited by examiner

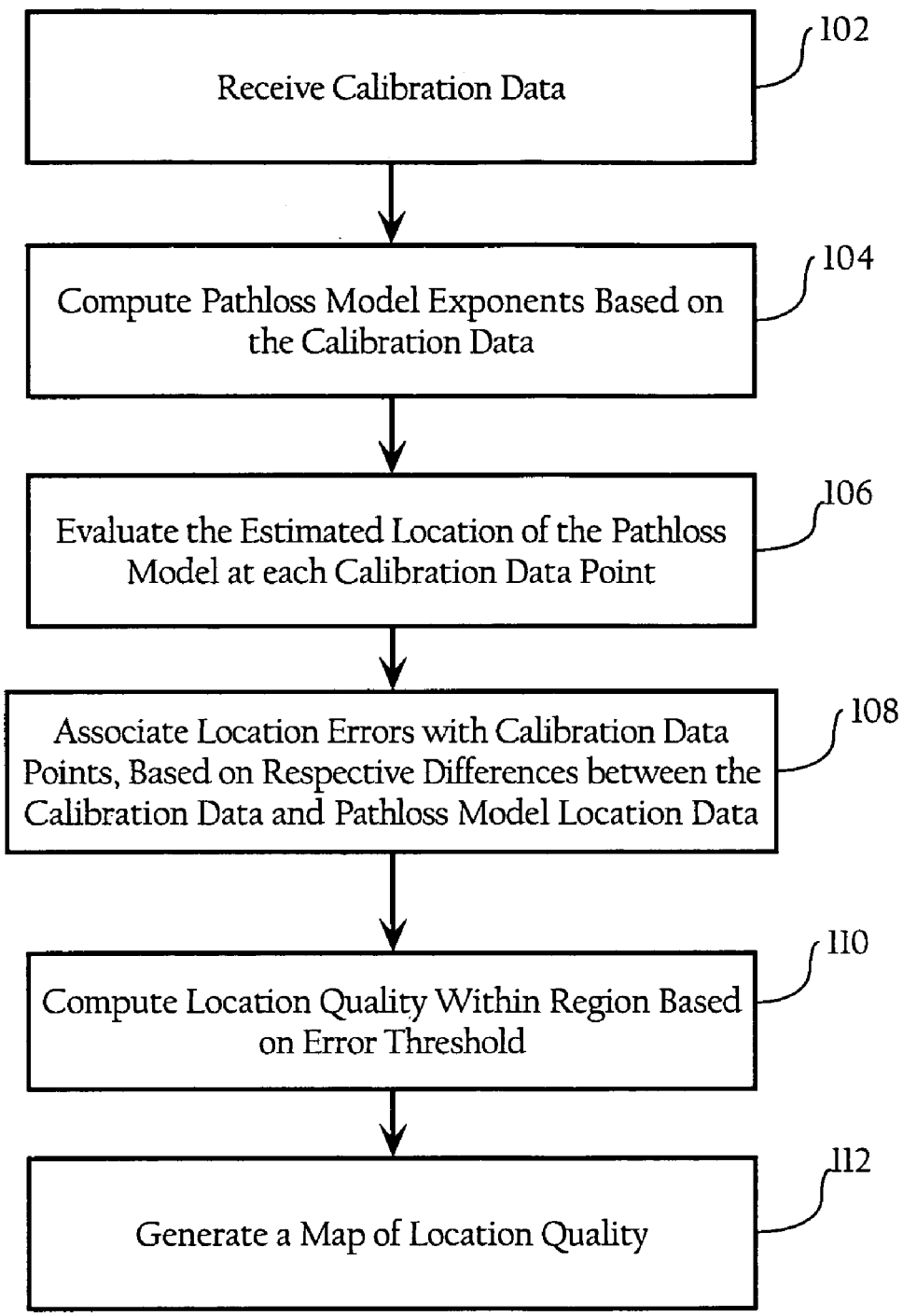
Fig._1

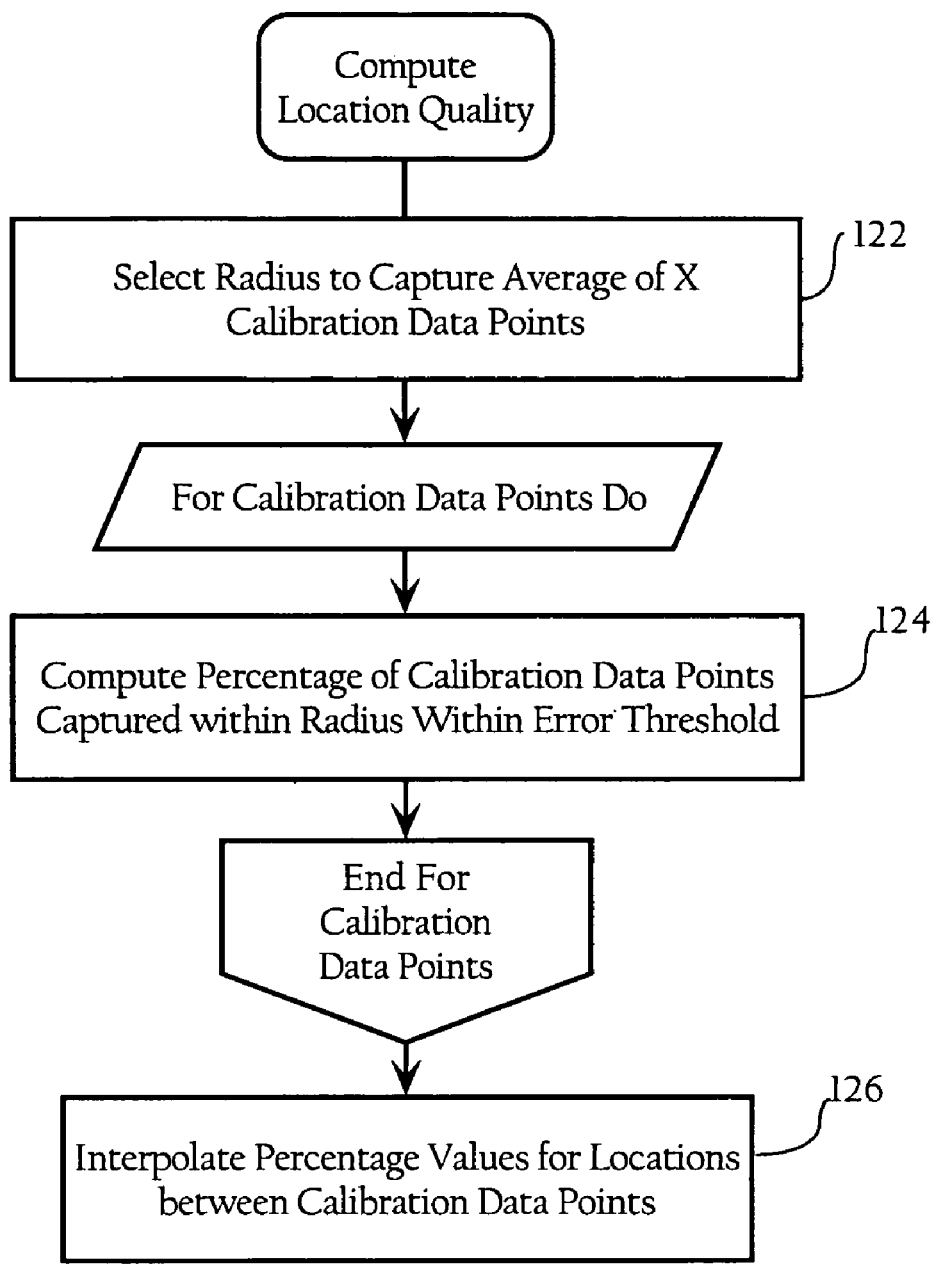
Fig._2

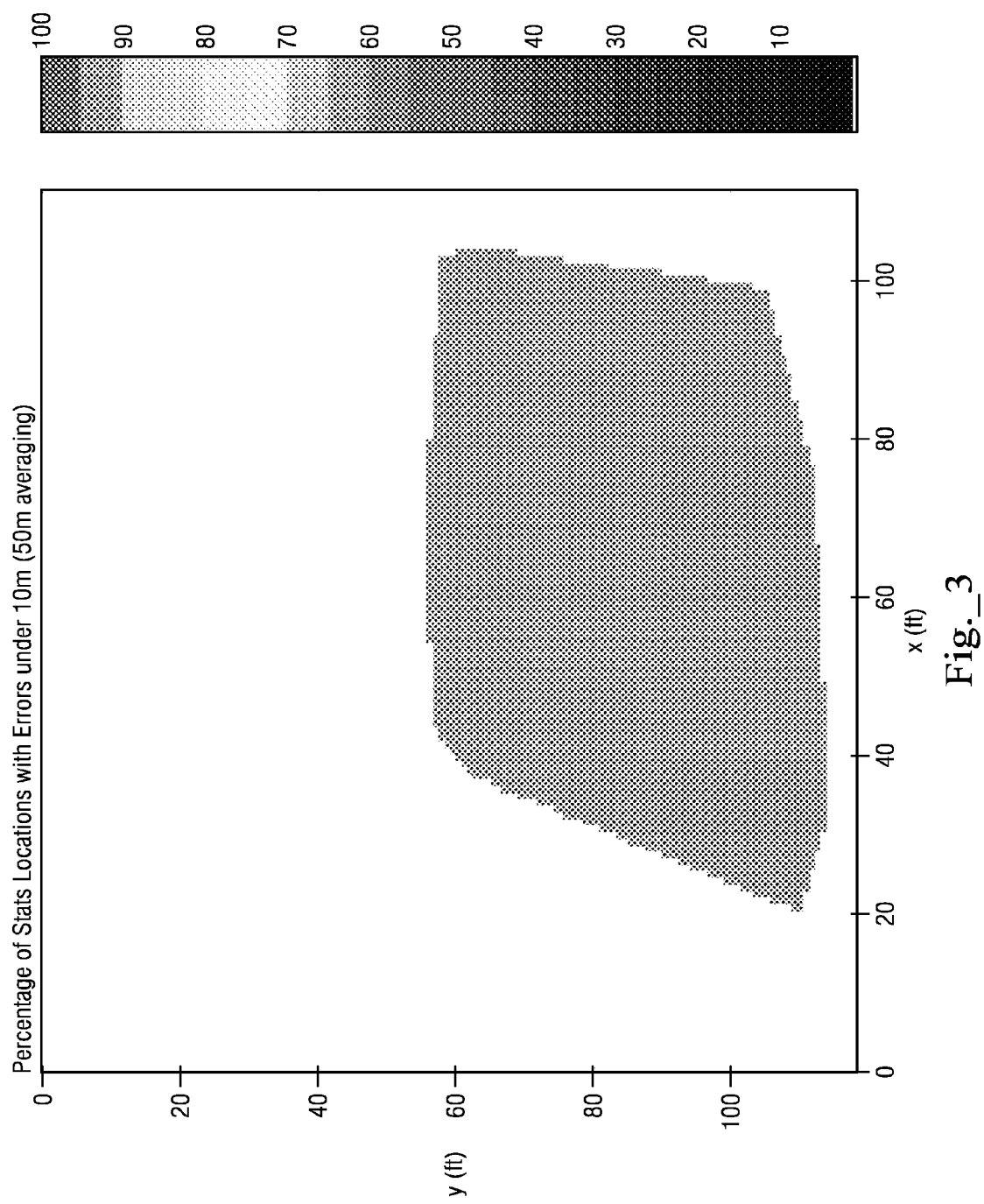
Fig._3

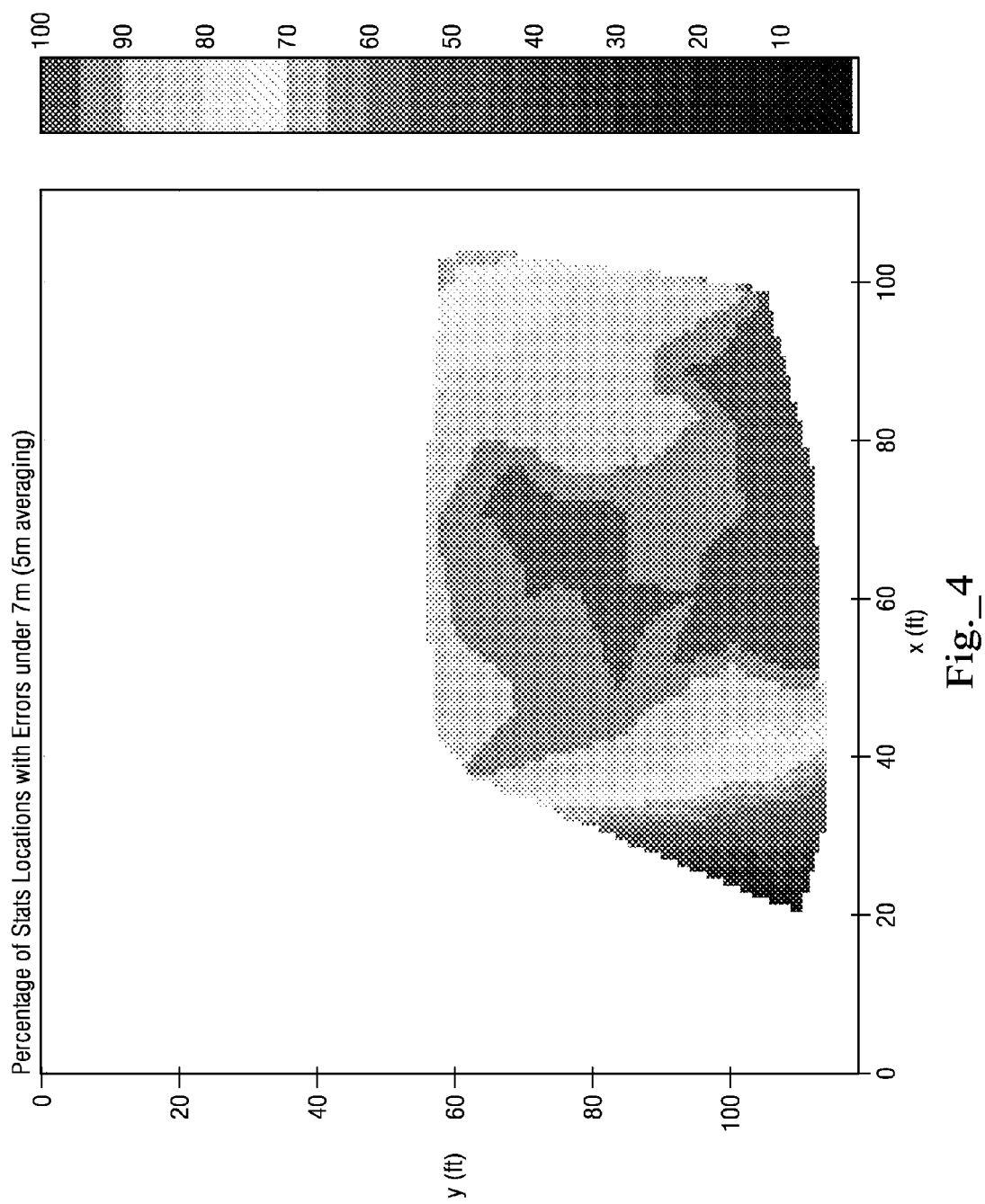
Fig._4

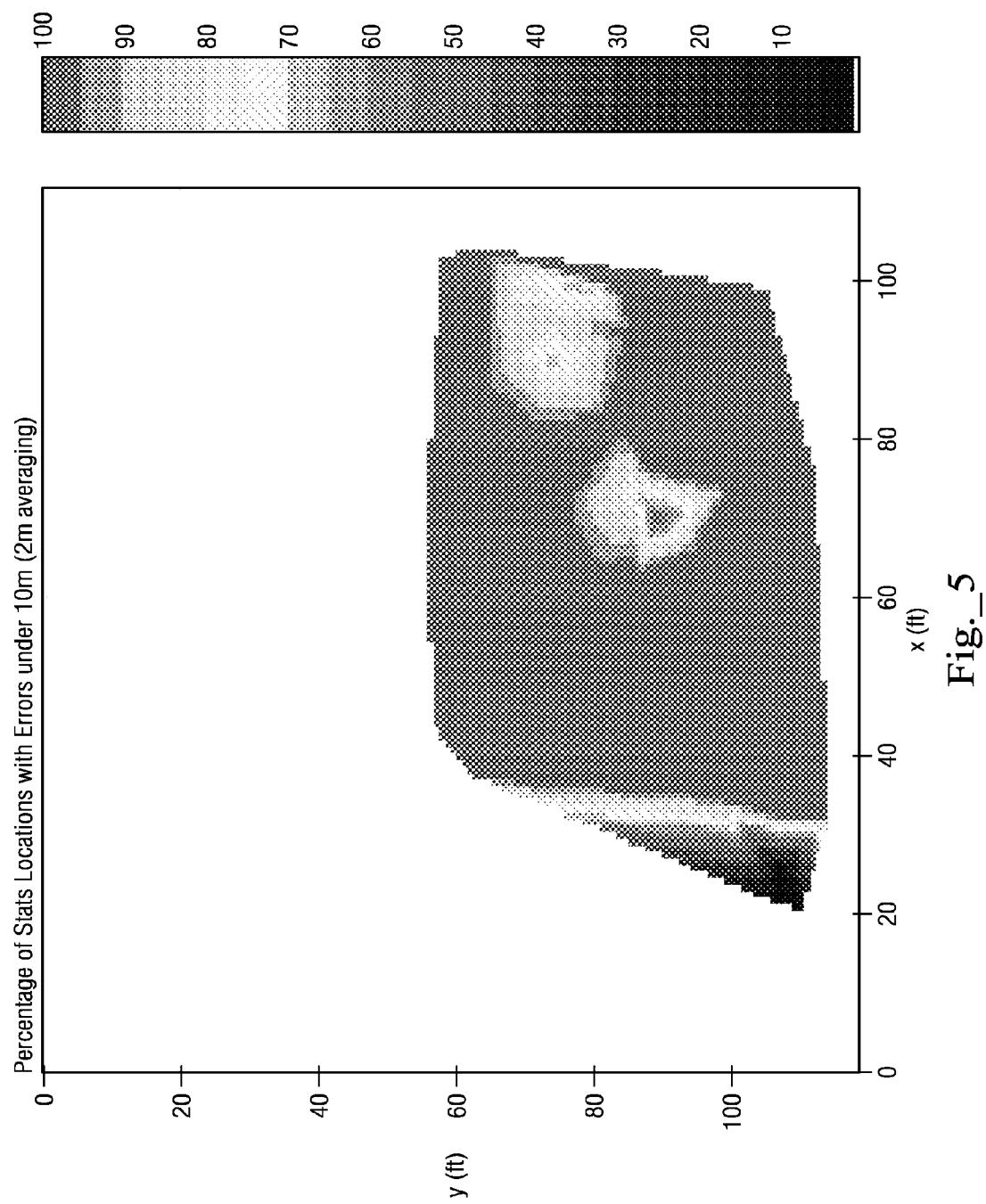

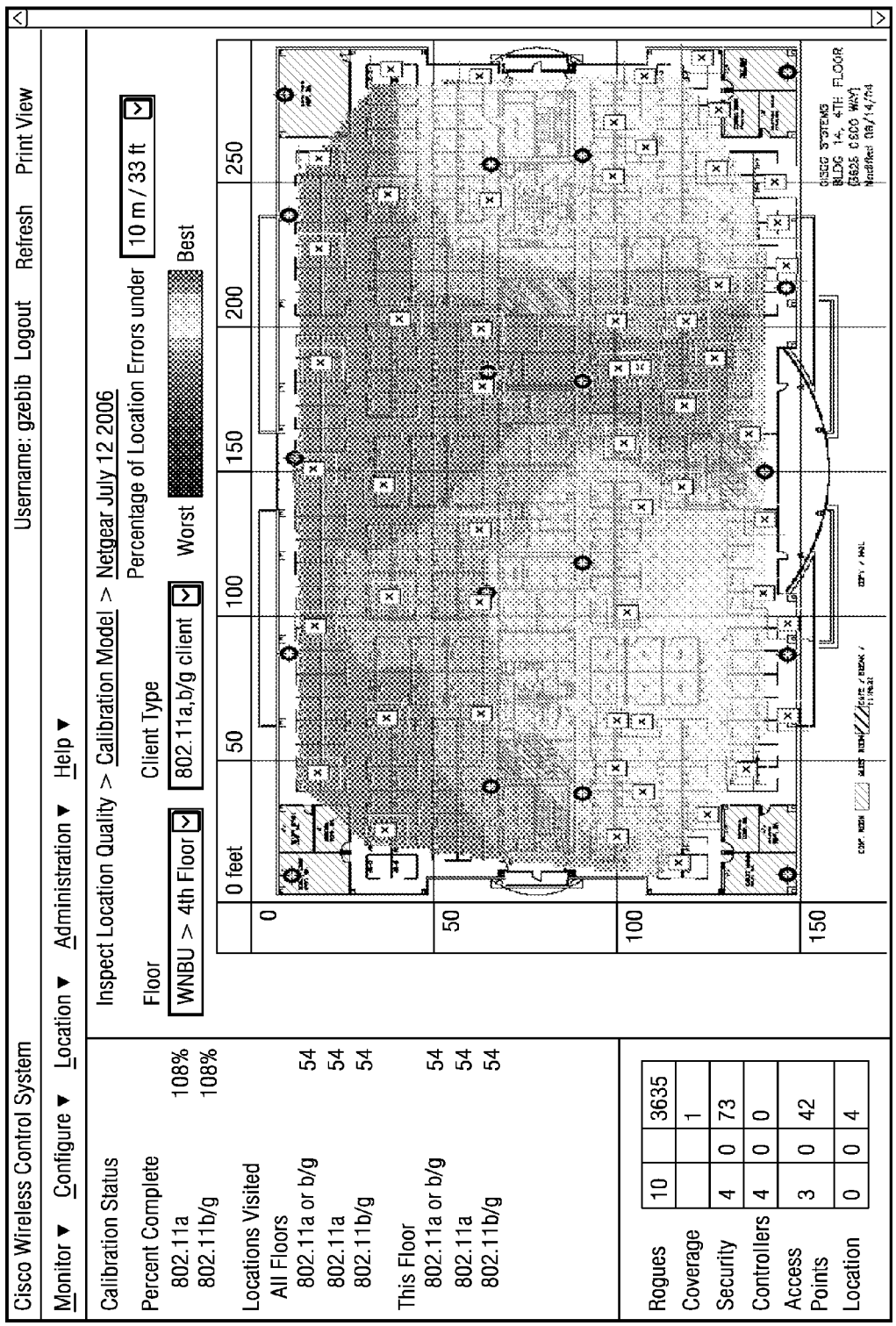
Fig._6

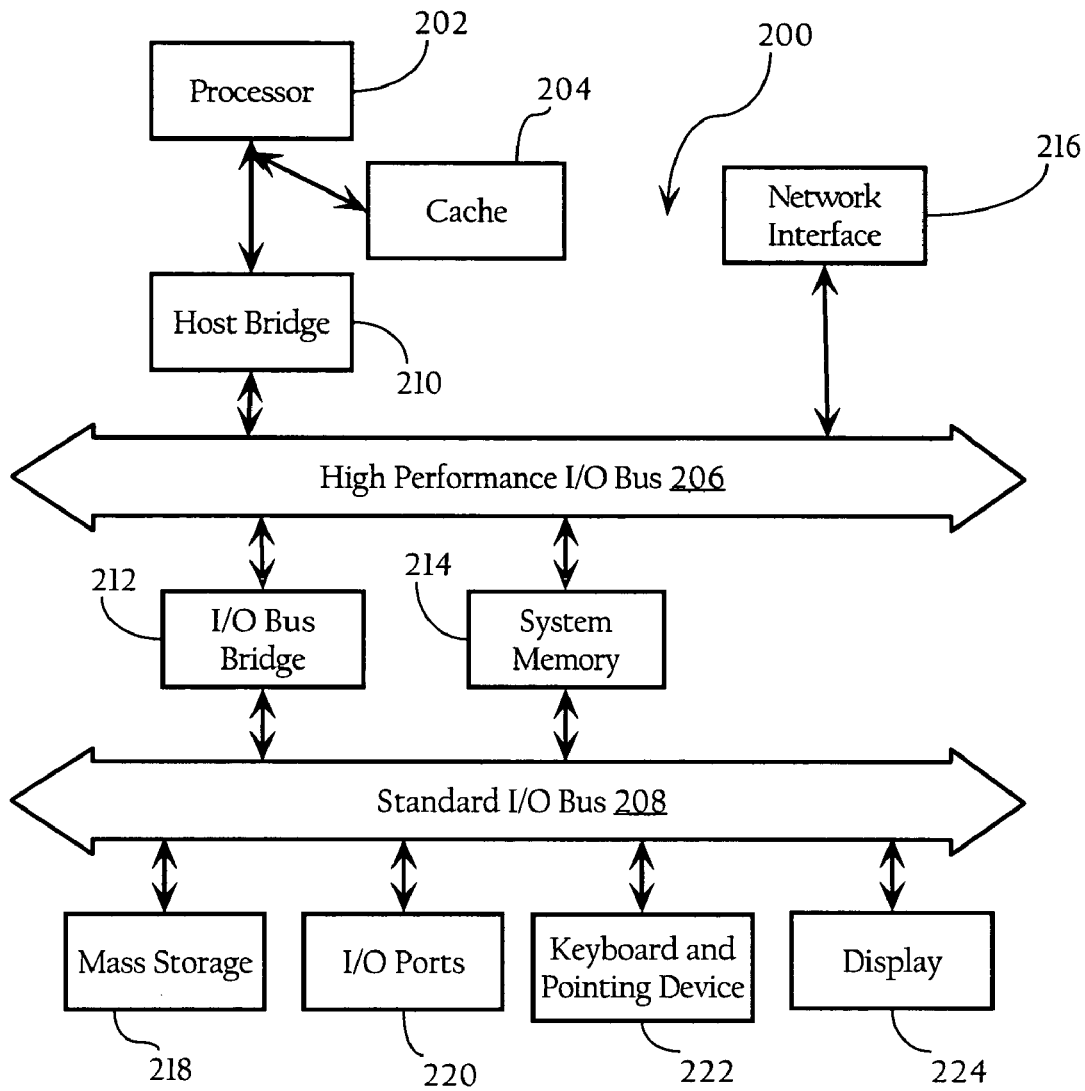
Fig._7

LOCATION INSPECTOR IN WIRELESS NETWORKS

TECHNICAL FIELD

This disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. Radio frequency (RF) coverage maps, also referred to as a heat maps, provide information regarding coverage of particular wireless access points. RF coverage maps are useful for assessing the area or region of sufficient WLAN service, and for use in locating wireless nodes. RF coverage maps are typically derived from manual site surveys and mathematical modeling techniques, such as ray tracing. However, shadowing from nearby walls and furniture, and the multipath effects inherent to various RF environments, make high accuracy coverage maps difficult to achieve.

DESCRIPTION OF THE DRAWINGS

FIG. 1 illustrates an example process flow associated with determining a map of location quality from wireless calibration data.

FIG. 2 illustrates an example process flow associated with computing a location quality in the process of FIG. 1.

FIG. 3 illustrates an example map of location quality.

FIG. 4 illustrates another example map of location quality.

FIG. 5 illustrates another example map of location quality.

FIG. 6 illustrates another example map of location quality.

FIG. 7 illustrates an example computing system architecture that can be used to implement one or more aspects of the functionality described herein.

DESCRIPTION OF EXAMPLE EMBODIMENTS

Particular embodiments of the present invention are directed to facilitating an evaluation of the accuracy of a location system used in connection with a wireless network. According to one implementation of the present invention, a location inspector provides a map of a physical region and a graphical indication of the computed likelihood that, at a given location, the location accuracy is within a desired threshold. In one implementation, the location inspector obtains calibration data including received signal strength values associated with known locations within a physical region and computes one or more attributes of a pathloss model based on the calibration data. As described in more detail below, while the calibration data may include received signal strength, the collection may include various types of data and may involve various location measurement techniques. The location inspector then compares the calibration data to the results achieved using the computed pathloss model attributes, and then associates location errors with the corresponding locations based on respective differences between the calibration data and the results of the computed pathloss model attributes. In one implementation of the present invention, the location inspector interpolates location quality of other locations between the calibration data points. The location inspector then generates a map of location quality based on the associated location errors and a given location error threshold. In one implementation, the map of location quality may indicate the likelihood that an estimated location is within a given threshold for one or more points in the region.

In one implementation, the location inspector applies a function, for one or more calibration data points, to smooth out effects of spurious values at a given calibration data point, to reduce the possible effect of these spurious values that would distract from more potentially serious location accuracy problems at other regions. For example, the location inspector, in one implementation, first selects, for each calibration data point, a radius that captures an average of X other calibration data points (e.g., 20 calibration points). The location inspector then identifies the percentage of captured calibration data points, where the location error is under a given error threshold. This computed percentage is the estimated likelihood at a given location that the location error falls within the error threshold. As discussed above, the location inspector can then use interpolation to derive values for locations within the physical region between the calibration data points. The location inspector may then optionally display the location accuracy on a graphical user interface, thereby visually showing problem areas within a physical region.

FIG. 1 illustrates an example process flow associated with determining the accuracy of an RF coverage map. As FIG. 1 illustrates, the location inspector first receives calibration data including received signal strength values, as observed by one or more radio receivers, corresponding to RF signals transmitted by a node at known locations (calibration data points) (102). In one implementation, the calibration data may include received signal strength values corresponding to RF signals of a radio transmitter at multiple known locations within a region, as observed by a plurality of radio receivers (such as wireless access points) also at known locations. Calibration data may also be obtained using site survey techniques where a WLAN tester or other device samples the RF signals of the wireless access points at a plurality of calibration data points.

Next, the location inspector computes a pathloss model based on the calibration data (104). In one implementation, the pathloss model may be described using the following expression:

$$\text{Received signal strength } (x, y) = Tx + \text{antenna gain}(x, y) + A + B \, 10 \log 10 d,$$

where (x, y) are expressed relative to the transmitting antenna, Tx is the transmit power, and d is the distance between a transmitter and receiver (a function of the x- and y-coordinates). In one implementation, Tx, the antenna gain, and d are known based on the calibration data points and the known locations of the access points or other radio transceivers. A and B are the pathloss exponents of the pathloss model (above), where A is a constant representing the y-intercept, and B is a slope. In one implementation, the location inspector computes the parameters (A, B) of the power law pathloss model based on the calibration data. A variety of modeling techniques can be used, such as curve fitting, and the like, to compute the pathloss model parameters that best fit the calibration data. Other modeling techniques may include estimating the standard deviation of the residual errors, the average floor-to-floor pathlosses, using curve fitting that accounts for the fact that received signal strength values below −90 dBm are not observable, using heatmaps, using calibration data to estimate the wall attenuations via least squares, etc. In one embodiment, the location inspector may use calibration data obtained from multiple floors of a building to compute the pathloss model exponents.

The location inspector then evaluates the estimated location of the pathloss model at each calibration data point (106). That is, the location inspector applies the received signal strength values of the calibration data to the pathloss model (including the computed pathloss model exponents) and estimates the resulting location. In one implementation, this is achieved by using the pathloss model to estimate distances between a node and the radio transceivers at known locations and triangulating based on these distances to estimate the location. In another implementation, the pathloss model can be used to compute coverage maps for the radio transceivers at known locations. The coverage maps can be used to compute error surfaces, which can be aggregated. The estimated location is determined by identifying the location in the aggregate error surface that minimizes the aggregate error.

The location inspector then associates location errors with calibration data points based on respective differences between the calibration data points and the estimated locations derived from the pathloss model based on the received signal strength values of the corresponding calibration data points (108). In one implementation, the location error is the distance between the calibration data point and the estimated location resulting from application of the pathloss model. Next, the location inspector computes the location quality within a region based on a given error threshold (110) (see FIG. 2, and description below), and generates a map of location quality indicating location quality at one or more points in the region (112). For example, an error threshold may be a configurable parameter (e.g., +/−3, 5, 7, 10 meters, etc.). Accordingly, the map of location quality indicates the likelihood that the estimated location is within a given threshold for one or more points in the region.

To determine the remaining accuracy of the remaining locations of an RF coverage map, the location inspector may then interpolate location errors of other locations based on the location errors derived from the calibration points, as described above in connection with FIG. 2. As described in more detail below, the location inspector may also compute a percentage of locations in a given area that meet a particular criteria (i.e., have associated location errors that fall below a certain threshold).

FIG. 2 illustrates an example process flow associated with computing a location quality in the process of FIG. 1. As FIG. 2 illustrates, the location inspector first selects, for all calibration data points, a radius that captures an average of X neighboring calibration data points (e.g., 20 calibration points) (122). As described above, in one implementation, multiple calibrations points are desired in order to prevent anomalous values to skew the results. In one implementation, the radius, R, can be based on the average density of calibration data points within a physical region:

$$R = \sqrt{\frac{(CoverageArea / \text{\# of}CalibrationPoints) * \text{\# of}Desiredpoints}{\pi}},$$

where CoverageArea is the area of the region of interest, #of CalibrationPoints is the total number of calibration data points in the region of interest, and #of Desiredpoints is the number of points to be captures within the radius R.

In another embodiment, the location inspector first selects, for each calibration data point, a radius that captures X neighboring calibration data points (e.g., 20 calibration points) (122). Consider the $0^{th}$ calibration data point without loss of generality. In one implementation, the radius, R(0), is chosen just large enough to encompass the X neighboring calibration data points as follows:

For the 0th calibration data point $C(x(0),y(0))$ and other calibration points $C(x(i),y(i))$, $i>0$, ordered such that $(x(i)-x(0))^2+(y(i)-y(0))^2$ is a non-decreasing function of i, then calculate R(0) as $\text{sqrt}((x(X)-x(0))^2+(y(X)-y(0))^2)$.

Next, the location inspector computes, for each calibration data point, the percentage of calibration data points captured within the radius, R, that are within a given error threshold (124). The location inspector then interpolates percentage values for locations between calibration data points (126). In one embodiment, the location inspector may utilize standard interpolation routines, such as two-dimensional linear interpolation, to interpolate the percentage values. Next, the location inspector generates a map of location quality for display indicating location quality at one or more points in the region. Such a display would visually show problem areas within a given RF coverage map, thereby visually showing problem areas within a given RF coverage map.

In an alternative embodiment, the location inspector may provide an estimated location error as a function of x- and y-location. In one implementation, the location inspector may generate, for each calibration data point, a location error at a configurable percentile within an area to provide a distance error versus (x,y) location. In one implementation, the location inspector first computes, for a given calibration point, the location errors within a defined circle around that calibration point. The location inspector then sorts the location errors The location inspector then selects one or more of a middle error (e.g., median), a maximum error (e.g., $100^{th}$ percentile) or a worst error (e.g., $90^{th}$ percentile), and then plots an interpolation of the location error at the configurable percentile to provide a distance error versus (x,y) location.

In one embodiment, the map of location quality may be color coded to indicate different degrees of error. The coverage map of location quality may then be used to enable a user such as network administrator to visualize location accuracy of existing RF coverage maps and also to determine potential locations for additional wireless access points. In one implementation, distinguishing between location accuracies of 85%, 90% or 95% may be desired. As indicated above, in one implementation, at least 20 points may be used in forming the accuracy percentage at each location. In one embodiment, the location inspector provides an averaging radius, such that any location accuracy measurement within a circle of that radius contributes to the location accuracy calculation at the middle of the circle. The user may select the averaging radius depending upon the particular deployment (e.g. 2, 3, 5, 7, 10, 20, 30, 50, 70, or 100 m). In another implementation, the location inspector may automatically calculate an appropriate radius depending on the average density of location accuracy measurements. In one implementation, the accuracy percentage is calculated for all locations within the averaging radius, and an accuracy percentage is assigned to the XY location at the center.

FIG. 3 illustrates an example map of location quality indicating location quality at one or more points in a region. FIG.

3 shows a percentage of locations with errors under 10 m (averaging 50 m). As shown, the accuracy percentage at each location is between 90% and 95%. If the accuracy specification is within 10 m, 90% of the time, then no problem areas appear to be present.

FIG. 4 illustrates another example map of location quality. FIG. 4 shows a percentage of locations with errors under 7 m (averaging 5 m). The accuracy percentage at each location ranges from 10% to under 100%. FIG. 4 shows a potential problem area in the lower-left portion of the map.

FIG. 5 illustrates another example map of location quality. FIG. 5 shows a percentage of locations with errors under 10 m (averaging 2 m). The accuracy percentage at each location ranges from 0% to under 100%. FIG. 5 shows potential problem areas in the lower-left portion and the lower-middle portion of the map. In one implementation, similar maps may be displayed that show selected percentile location errors as a function of location.

FIG. 6 illustrates a user interface including another example map of location quality. FIG. 6 shows a color-coded map indicating different degrees of error, under 10 m. FIG. 6 shows a map similar to the maps of FIGS. 3-5, except that the map of FIG. 6 is overlaid onto a floor plan of a building.

FIG. 7 illustrates an example computing system architecture, which may be used to implement an RF coverage map generator, which may be used to perform the location inspection processes described above. In one implementation, the location inspector may comprise a software application hosted on a personal computer, or on a server implementing HTTP or other server functionality. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, I/O ports 220, keyboard and pointing device 222, and display 224 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location inspector, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the location inspector described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A storage medium comprising a plurality of programming instructions to be executed by a processor to:
    receive calibration data associated with a plurality of calibration data points, wherein:
        each calibration data point is at a known location; and
        the calibration data comprise a plurality of received signal strength values corresponding to a plurality of radio frequency (RF) signals transmitted from the plurality of calibration data points respectively;
    compute one or more attributes of a pathloss model based on the calibration data to obtain the pathloss model that best fits the calibration data;
    compute, using the pathloss model, a plurality of estimated locations for the plurality of calibration data points respectively using the plurality of received signal strength values;

associate a plurality of location errors with the plurality of calibration data points respectively, wherein for each calibration data point, its location error is a distance difference between the known location of the calibration data point and the estimated location computed for the calibration data point;

compute a location quality within a region comprising the plurality of calibration data points and one or more other locations between the plurality of calibration data points, comprising:

for each calibration data point in the region, determine a percentage of the location errors associated with two or more calibration data points within a radius of the calibration data point that are within a given error threshold; and for each other location between the plurality of calibration data points in the region, interpolate the percentages of two or more calibration data points; and generate a map of location quality based on the percentages of the plurality of calibration data points and the interpolated percentages of the one or more other locations between the plurality of calibration data points.

2. The storage medium of claim 1, wherein for each other location between the plurality of calibration data points in the region, interpolate the percentages of the two or more calibration data points using two-dimensional linear interpolation.

3. The storage medium of claim 1, wherein the plurality of programming instructions is further operable to, for each calibration data point in the region, determine the radius based on an average density of the plurality of calibration data points in the region.

4. The storage medium of claim 1, wherein for each calibration data point in the region, the radius is predefined.

5. The storage medium of claim 1, wherein the map of location quality is color coded to indicate different degrees of error.

6. The storage medium of claim 1, wherein, for each calibration data point in the region, the radius captures twenty or more calibration data points for determining the percentage.

7. The storage medium of claim 1, wherein, to compute the location quality, the plurality of programming instructions is further operable to cause the at least one processor to:

select, for each calibration data point in the region, the radius that captures a desired number of calibration data points;

sort the location errors associated with the captured calibration data points by percentile of location errors; and interpolate, based on a selected percentile parameter, a distance error versus (x,y) for the one or more other locations between the plurality of calibration data points.

8. The storage medium of claim 1, wherein the given error threshold is based at least in part on one or more of a configurable error threshold and an accuracy percentage.

9. A method comprising: by one or more computing devices, receiving calibration data associated with a plurality of calibration data points, wherein:

each calibration data point is at a known location; and the calibration data comprise a plurality of received signal strength values corresponding to a plurality of radio frequency (RF) signals transmitted from the plurality of calibration data points respectively;

computing one or more attributes of a pathloss model based on the calibration data to obtain the pathloss model that best fits the calibration data;

computing, using the pathloss model, a plurality of estimated locations for the plurality of calibration data points respectively using the plurality of received signal strength values;

associating a plurality of location errors with the plurality of calibration data points respectively, wherein for each calibration data point, its location error is a distance difference between the known location of the calibration data point and the estimated location computed for the calibration data point;

computing a location quality within a region comprising the plurality of calibration data points and one or more other locations between the plurality of calibration data points, comprising:

for each calibration data point in the region, determining a percentage of the location errors associated with two or more calibration data points within a radius of the calibration data point that are within a given error threshold; and for each other location between the plurality of calibration data points in the region, interpolating the percentages of two or more calibration data points; and generating a map of location quality based on the percentages of the plurality of calibration data points and the interpolated percentages of the one or more other locations between the plurality of calibration data points.

10. The method of claim 9 wherein the location quality is further based on the given error threshold.

11. The method of claim 9 wherein the map of location quality indicates an accuracy percentage at one or more locations.

12. The method of claim 9 wherein the map of location quality indicates a percentage of locations with errors within a circle having a predefined radius.

13. The method of claim 9 wherein the map of location quality is color coded to indicate different degrees of error.

14. The method of claim 9 wherein, to compute location quality, the method further comprises:

selecting, for all calibration data points, a radius that captures a desired average number of calibration data points;

computing the percentage of calibration data points captured within the radius and within the given error threshold; and interpolating percentage values for locations between calibration data points.

15. The method of claim 9 wherein, to compute location quality, the method further comprises:

selecting, for each calibration data point, a radius that captures a desired number of calibration data points;

computing location errors for the captured calibration data points captured within the radius;

sort the location error by percentile of location errors; and interpolating, based on a selected percentile parameter, a distance error versus (x,y) for locations between calibration data points.

16. The method of claim 9, wherein the given error threshold is based at least in part on one or more of a configurable error threshold and an accuracy percentage.

17. A system comprising:

a server comprising a location inspector application stored in a memory, wherein the location inspector application comprises programming instructions operable to cause the server to:

receive calibration data associated with a plurality of calibration data points, wherein:

each calibration data point is at a known location; and the calibration data comprise a plurality of received signal strength values corresponding to a plurality of radio frequency (RF) signals transmitted from the plurality of calibration data points respectively;

compute one or more attributes of a pathloss model based on the calibration data to obtain the pathloss model that best fits the calibration data;

compute, using the pathloss model, a plurality of estimated locations for the plurality of calibration data points respectively using the plurality of received signal strength values;

associate a plurality of location errors with the plurality of calibration data points respectively, wherein for each calibration data point, its location error is a distance difference between the known location of the calibration data point and the estimated location computed for the calibration data point;

compute a location quality within a region comprising the plurality of calibration data points and one or more other locations between the plurality of calibration data points, comprising:
- for each of the calibration data point in the region, determine a percentage of the location errors associated with two or more calibration data points within a radius of the calibration data point that are within a given error threshold; and
- for each other location between the plurality of calibration data points in the region, interpolate the percentages of two or more calibration data points; and generate a map of location quality based on the percentages of the plurality of calibration data points and the interpolated percentages of the one or more other locations between the plurality of calibration data points; and a wireless access point operable to facilitate collection of the calibration data.

18. The system of claim 17 wherein the location quality is further based on the given error threshold.

19. A method comprising: by one or more computing devices,
receiving a plurality of received signal strength values each of which corresponding to a radio frequency signal transmitted from one of a plurality of known first locations and received at one of a plurality of known second locations;

determining a pathloss model that best fits the received signal strength values, the pathloss model representing a received signal strength value as a function of location, the function comprising one or more configurable variables;

computing a plurality of estimated first locations each of which corresponding to one of the known first locations and being computed using the best-fit pathloss model based on the received signal strength value corresponding to the radio frequency signal transmitted from the corresponding known first location;

computing a plurality of location errors for the known first locations, each of the location errors being a distance difference between a corresponding pair of known first location and estimated first location;

determining a location quality for a region comprising the known first locations and one or more third locations between the known first locations, comprising:
- for each of the known first locations, determining a percentage of the location errors of two or more known first locations within a radius of the known first location that are within a given error threshold; and
- for each of the third locations between the known first locations, interpolating the percentages of two or more known first locations; and constructing a color coded map of the location quality, such that different percentages of different known first locations or third locations are represented using different colors.

20. The method of claim 19, wherein determining the best-fit pathloss model comprises:
applying each of the received signal strength values and the corresponding known first location and known second location to the function; and
adjusting one or more values of the configurable variables.

21. The method of claim 19, wherein computing each of the estimated first locations comprises applying the received signal strength values corresponding to the radio signal transmitted from the corresponding known first location to the best-fit pathloss model with the configurable variables each having a best-fit value.

22. The method of claim 19, wherein for each of the known first locations, the radius captures twenty or more known first locations for determining the percentage.

* * * * *